(12) United States Patent
Spuler

(10) Patent No.: US 7,955,047 B2
(45) Date of Patent: Jun. 7, 2011

(54) VARIABLE GEOMETRY TURBINE

(75) Inventor: Juerg Spuler, Neukirch (CH)

(73) Assignee: Iveco Motorenforschung AG, Arbon (CH)

( * ) Notice: Subject to any disclaimer, the term of this patent is extended or adjusted under 35 U.S.C. 154(b) by 934 days.

(21) Appl. No.: 11/895,429

(22) Filed: Aug. 24, 2007

(65) Prior Publication Data
US 2009/0097969 A1    Apr. 16, 2009

(30) Foreign Application Priority Data

Sep. 12, 2006 (IT) .............................. MI2006A1738

(51) Int. Cl.
*F01D 17/14* (2006.01)
(52) U.S. Cl. ........ 415/144; 415/145; 415/147; 415/157; 415/165
(58) Field of Classification Search .................. 415/144, 415/145, 147, 157, 158, 165
See application file for complete search history.

(56) References Cited

U.S. PATENT DOCUMENTS

| | | | |
|---|---|---|---|
| 3,044,683 A * | 7/1962 | Woollenweber, Jr. ........ | 415/143 |
| 4,499,731 A * | 2/1985 | Moser ........................... | 415/157 |
| 6,536,214 B2 * | 3/2003 | Finger et al. ................... | 60/602 |
| 2004/0128997 A1 | 7/2004 | Parker | |

FOREIGN PATENT DOCUMENTS

WO    WO 98/14691    4/1998

* cited by examiner

*Primary Examiner* — Igor Kershteyn
(74) *Attorney, Agent, or Firm* — Stetina Brunda Garred & Brucker

(57) ABSTRACT

Variable geometry turbine, in particular a gas turbine, comprising a housing (2, 22), a turbine rotor (4), a fluid inlet scroll (1) that surrounds the turbine rotor, a vaned nozzle interposed between the inlet scroll and the turbine rotor conceived to accelerate the flow of fluid, the nozzle comprising an axially adjustable ring (5, 25) conceived to vary the nozzle gap (3, 23) and having a wall (19) delimiting the nozzle gap, the wall having balance holes (6, 26, 26') connecting the nozzle gap with a chamber (12) delimited by the housing and the ring, characterised in that the edges (16), formed by the holes with the surface (18) of the wall facing the nozzle gap, are rounded in the portion (17, 17') located downstream the holes with respect to the fluid flow. Turbocharger and supercharged engine comprising the engine.

9 Claims, 5 Drawing Sheets

VARIABLE GEOMETRY TURBINE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

The present invention concerns a variable geometry turbine, in particular for a turbocharger for a supercharged internal combustion engine, and said turbocharger and engine.

2. Prior Art

Known variable geometry turbines (VGT) have a drive fluid inlet in form of a scroll surrounding the turbine rotor, and a vaned annular nozzle located between said inlet scroll and the turbine rotor. On VGT's of the "moving wall" type, the nozzle gap is axially adjustable to control the power of the turbine and, in case of VGT turbochargers for supercharged internal combustion engines, the back pressure at the exhaust manifold of the engine (this is particularly useful when used as exhaust brake).

FIG. 1 shows a typical "moving wall" VGT. The figure represents a longitudinal section, according to a plane containing the axis 10 of the turbine rotor 4 (shown not sectioned). The fluid inlet scroll is designated by 1. The annular nozzle gap allowing the fluid flowing from the inlet scroll to the turbine rotor is designated by 3, a vane of the nozzle by 7. The vanes are fixed to the axially adjustable ring 5, apt to translate in the direction of the arrow A. The movement in one direction reduces the nozzle gap, the movement in the opposite direction increases it. When the adjustable ring is moved in the closing direction, the vane grid is received into the annular hollow 11 provided in the turbine housing 2; a pierced shroud 8 with slots corresponding to the shape of the vane grid can be foreseen to prevent the fluid flow bypassing the nozzle gap. Alternatively, a configuration can be provided featuring a fixed vane grid on the wall opposite to the axially adjustable ring, and the axially adjustable ring featuring slots to accommodate the vanes. The adjustable ring can be configured as an annular piston, being housed inside an annular chamber 12, able to move out and to extend into the nozzle gap; sealing means 13, such as an outer and an inner sealing ring, are placed between the adjustable ring and the chamber walls. An actuating system (not shown) is provided to control the axial position of the adjustable ring according to the requirements. The actuator can be pneumatic, hydraulic, or electric, possibly comprising reset springs, and may be placed inside or external to the VGT housings. It can act, for example, through rods (not shown) extending along the direction of movement of the axially adjustable ring, said rods attached to the ring 5 on the side facing the annular chamber 12. The rods (or any similar guide system) may prevent rotation of the adjustable ring around axis 10, which would be caused by fluid forces against the inclined vanes. The actuator must hold the resetting force exerted by the fluid pressure onto the axially adjustable ring, which can be of considerable magnitude. In order to reduce the resetting load onto actuator and actuating mechanism, balance holes 6 are commonly provided on the axial wall of the adjustable ring, normally one hole for each fluid passage between two consecutive vanes, as shown in FIG. 2, in order to balance the pressure between the nozzle gap 3 and the chamber 12.

On exhaust gas driven turbines, the size of the balance holes must be matched to allow proper transmission of the exhaust pressure waves generated by reciprocating engines, such as standard internal combustion engines. The pressure waves otherwise could generate vibration wear on the whole VGT actuating mechanism, and on other members such as seals and bushings. Moreover, the pressure waves can provoke significant oscillation of the actuating mechanism, at least with certain types of actuators, in particular pneumatic and electric ones. To keep vibration and oscillation on an acceptable level, the size of the balance holes has to be relatively large, their diameter may reach up to 90% of the fluid passage width. This includes the disadvantage that the balance holes cause considerable disturbance to the fluid flow through the nozzle gap. Reducing the nozzle gap, respectively narrowing the fluid passage between consecutive vanes, increases the interference of the holes with the fluid flow. At very narrow nozzle gaps, the remaining flow area in the nozzle gap becomes less than the total area of the balance hole array. In such condition, the balance holes represent significant sinks for the flow, leading to a expansion of the fluid flow into the holes, in turn the downstream edges of the balance holes become fluid-dynamical significant obstacles.

On known pressure balance arrays, the balance holes are machined or laser cut, and have (in fluid-dynamical view) relatively sharp edges, although a small countersink may be provided in order to remove burrs. The downstream portion of such balance hole edges therefore can provoke flow separation, leading to an undesirable pressure drop in the flow passage downstream the hole, and thus to a reduction in the resetting force exerted onto the adjustable ring. This effect becomes most obvious at small nozzle gaps and choke flow condition, where sonic speed is reached in the nozzle gap. In said condition, the resultant resetting force acting onto the axially adjustable ring can drop sharply, and can end up in reversed force direction.

In FIG. 3 the resetting force F (in ordinate) typically acting on the adjustable ring, and from there on the whole actuating mechanism, is qualitatively represented as a function of the nozzle gap L (in abscissa). As the nozzle gap decreases, a gradual increase of the resetting force is observed for almost the whole adjustable range, while at a narrow nozzle gap the force collapses due to the interference of the holes with the fluid flow. Safe control of the variable geometry nozzle at such small nozzle gaps thus becomes impossible, limiting the minimum admissible nozzle gap to values much higher than those that would be desirable under particular operation conditions. Generally speaking the control of known systems is unsatisfactory at small nozzle gaps. The turbo brake power (engine brake power) of VGT-supercharged vehicle engines is therefore limited, as well as engine response in transient operation conditions.

BRIEF SUMMARY

According to the present invention, the problems exposed above have been solved by applying a generous rounding on the downstream edges of the balance holes, at the balance hole muzzles facing the fluid flow.

According to a preferred embodiment of the invention, the turbine is a gas turbine, and is in particular a turbine of a turbocharger for a supercharged internal combustion engine, said turbocharger and engine being further aspects of the invention.

BRIEF DESCRIPTION OF THE DRAWINGS

The present invention will now be illustrated by a detailed description of preferred, but not limiting, embodiments, given for example purpose, with the help of the enclosed figures whereof.

DETAILED DESCRIPTION

Figure 4:
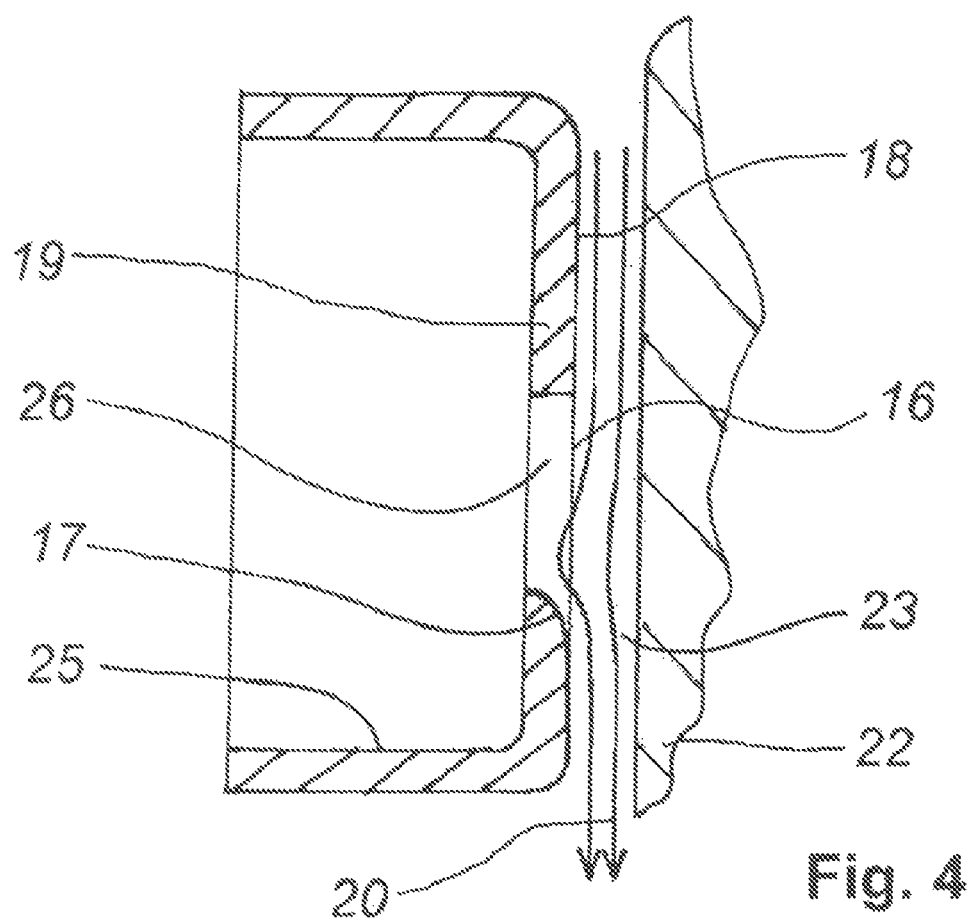
FIG. 4 schematically shows a section view of an axially adjustable ring of a VGT according to the present invention.

The VGT according to the present invention can be designed and manufactured in a similar way as the one of prior art described above, except for the shape of the balance hole muzzles. FIG. 4 shows a detail section according to a plane parallel with the flow lines of the fluid through the nozzle gap (depending on the inclination of the vanes) of a VGT according to the present invention; the axially adjustable ring 25 is shown at minimum nozzle gap, and the flow from the inlet scroll to the turbine rotor is schematically indicated by the arrows 20. A balance hole 26 is provided in wall 19, whose surface 18 faces the nozzle gap 23. The edge 16, delimiting the hole 26 from the surface 18 presents a rounded portion, downstream the hole with respect to the fluid flow.

Figure 5:
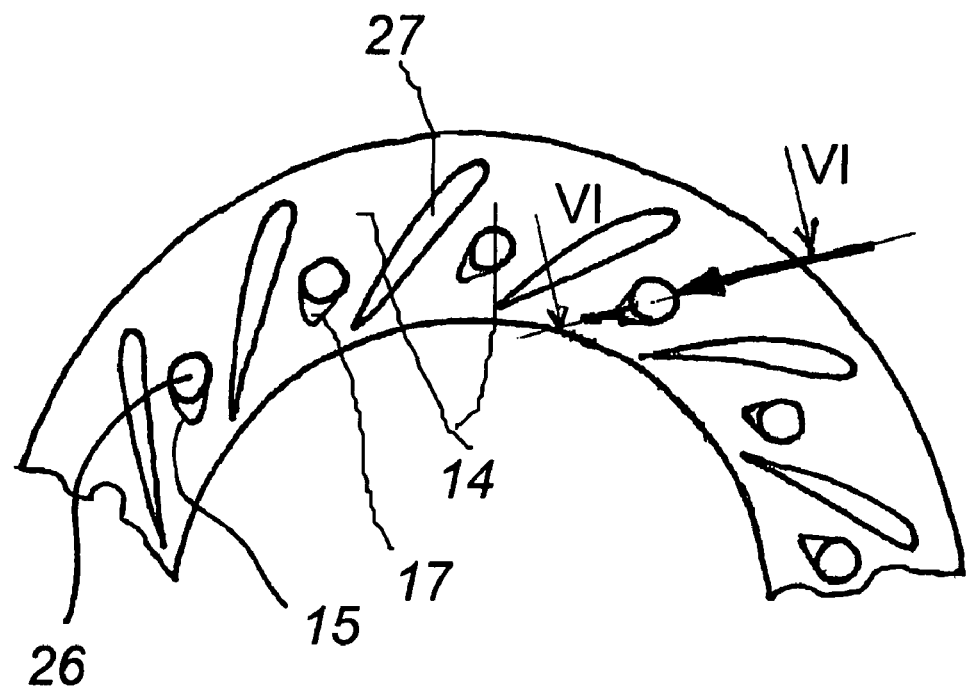
FIG. 5 schematically shows a plane view from the nozzle gap onto the axially adjustable ring of a VGT according to the present invention.

According to a preferred embodiment not all of the edge is rounded off, nor is the rounding curvature deploying uniformly. The curvature radius of the edge can gradually vary from 0 (sharp edge) or from a minimum in the less concerned areas, to a maximum for example in the zone downstream with respect to the centre of the hole. This results in a shape of the rounded zone extended in the direction of the fluid flow. In FIG. 5 a partial view of the ring surface 18 facing the nozzle gap 23 is shown. There are shown the vanes 27 and the balance holes 26 with the rounded portion 17 and that the arrow 20 indicates the direction of the fluid. The vanes delimit a series of passages 14. According to a preferred embodiment, a hole 26 is provided for each passage 14, centrally positioned with respect to the two vanes delimiting the passage. The rounded portion can form, with the surface 19, a border 15 whose shape can depend on how the rounding is performed along the edge (for example a parabolic or elliptic shape).

Figure 6:
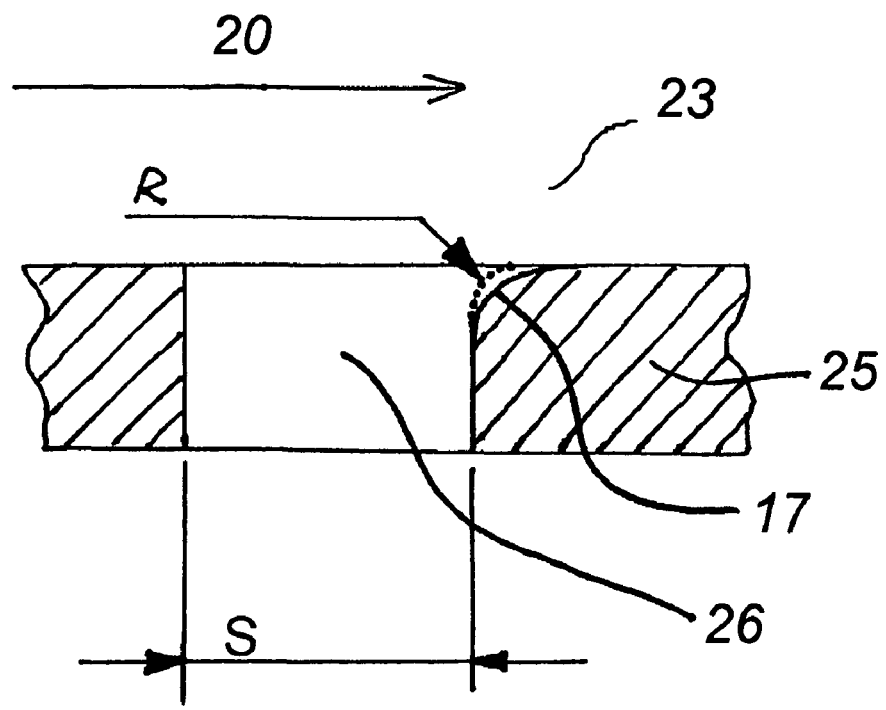
FIG. 6 schematically shows the section view VI-VI of the adjustable ring of FIG. 5.
Figure 7:
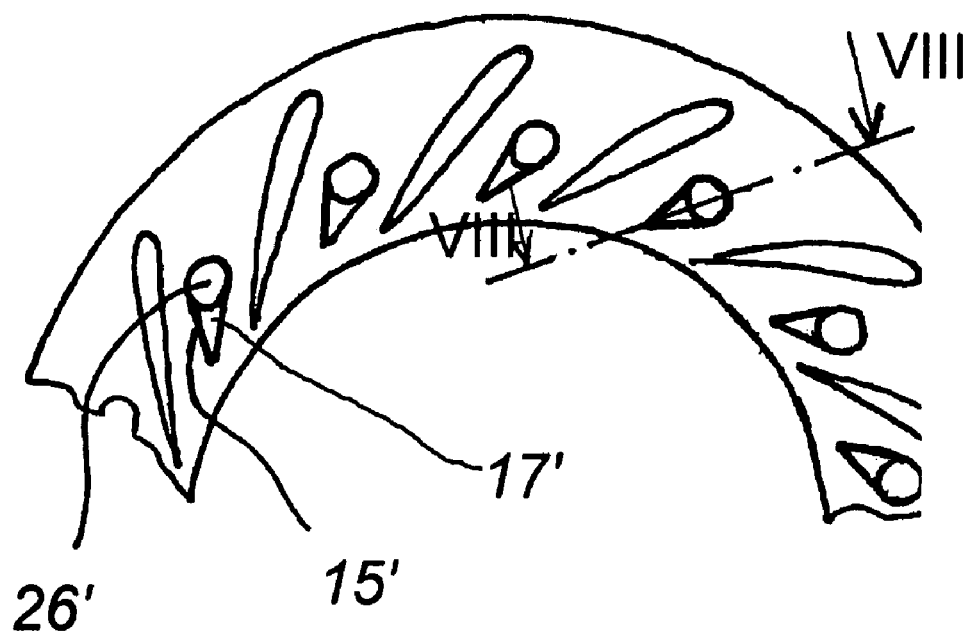
FIG. 7 schematically shows a plane view from the nozzle gap onto an axially adjustable ring of a VGT according to another aspect of the present invention.
Figure 8:
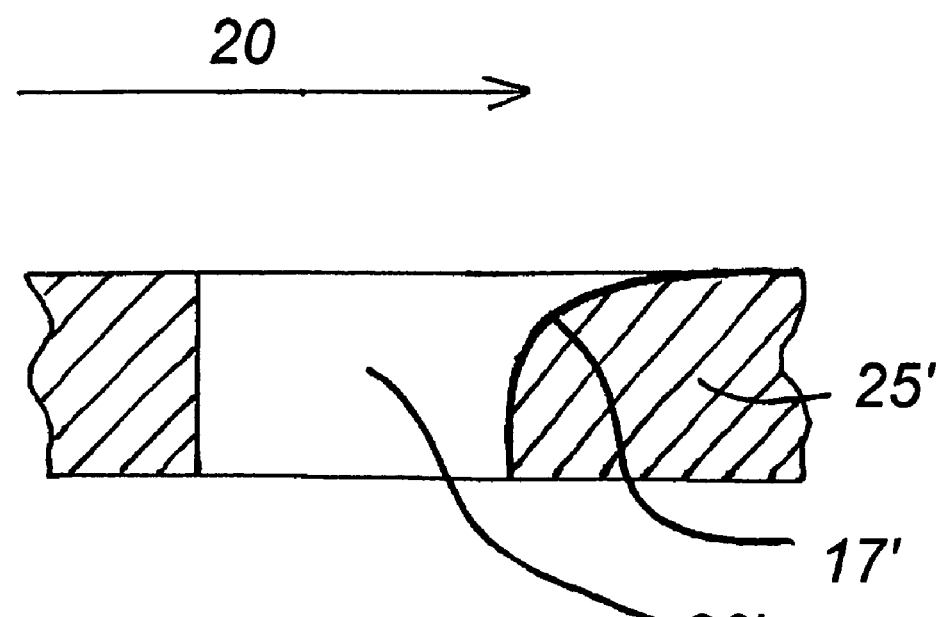
FIG. 8 schematically shows the section view VIII-VIII of the adjustable ring of FIG. 7.
Figure 9:
FIG. 9 schematically shows a plane view from the nozzle gap onto an axially adjustable ring of a VGT according to a further aspect of the present invention.
Figure 10:
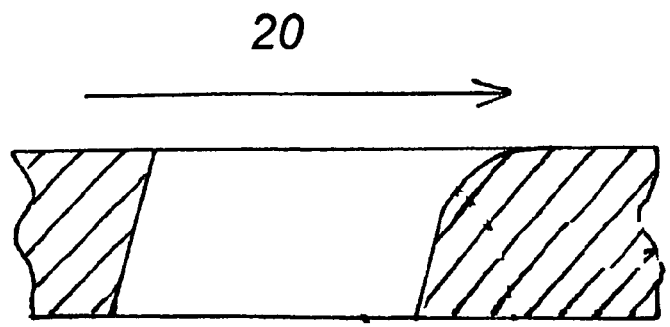
FIG. 10 schematically shows section view X-X view of the axially adjustable ring in FIG. 9.

It has been discovered that the curvature radius R, in the edge portion where it is at its maximum value, must be greater than 20% of the maximum width S of the hole (without taking the rounding off in account) in the mean fluid flow direction across the area of the hole, in order to achieve useful results. With reference to FIG. 6, showing section VI-VI of FIG. 5, it can be appreciated that dimension S can substantially be the diameter of the hole, when it has circular section. FIGS. 7 and 8 show a preferred embodiment with a generous rounding 17', extending the border 15' downstream. The balance holes can have a circular section or another shape. Independently, they can have internal walls (without considering the rounded area) that are perpendicular or inclined with respect to the wall of the adjustable ring. According to a possible embodiment, the internal walls can be to some extent inclined in the direction and in the sense of the fluid flow. This further improves the resetting characteristics. FIGS. 9 and 10 show a nozzle ring with inclined holes having a non circular section.

The holes can be produced by any suitable known technology, as well as the rounding off. They can be made, for example, by three axis milling, using radius or torus cutters having a diameter that is equal or slightly smaller than that of the balance hole.

As in the prior art, the adjustable ring can be vaned, or can have slots apt to receive the vanes of an opposed fixed vane grid. All the solutions commonly applied on VGT's of the "moving wall" type can be adopted, with the appropriate changes. The adjustable ring can be operated by various types of actuators, as discussed above.

Figure 1:
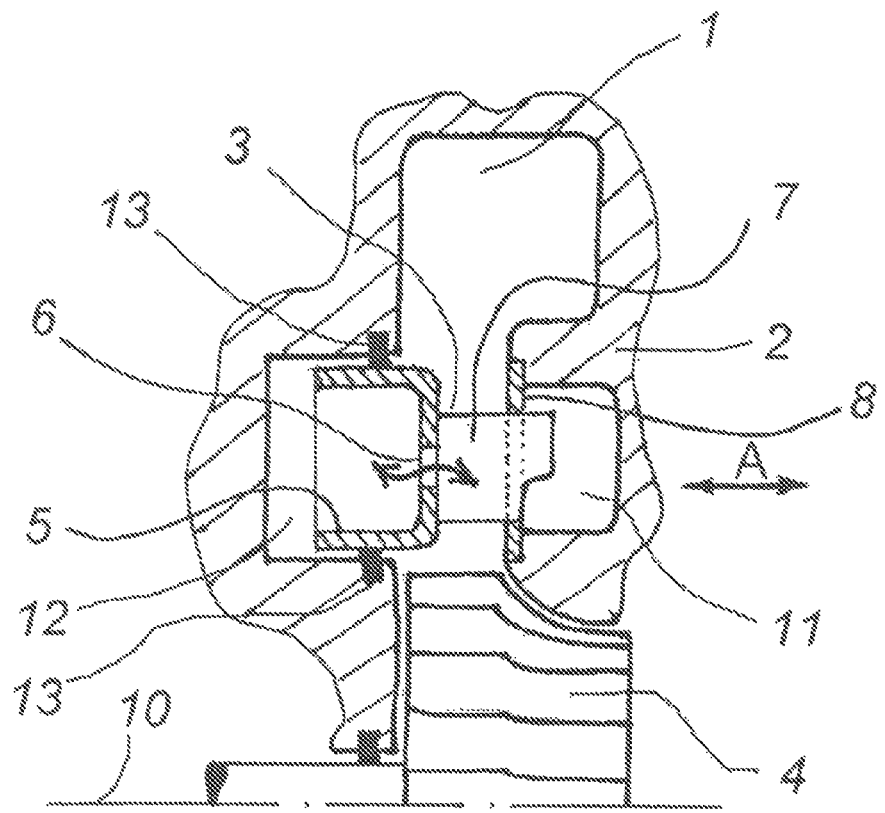
FIG. 1, already discussed above, shows a longitudinal section view of a VGT according to the prior art.
Figure 2:
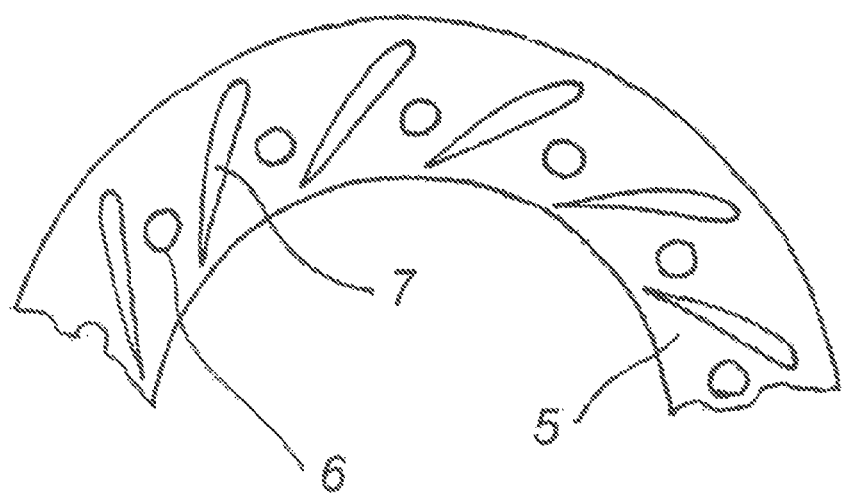
FIG. 2, already discussed above, schematically shows a plane view from the nozzle gap onto the axially adjustable ring of the VGT of FIG. 1.
Figure 3:
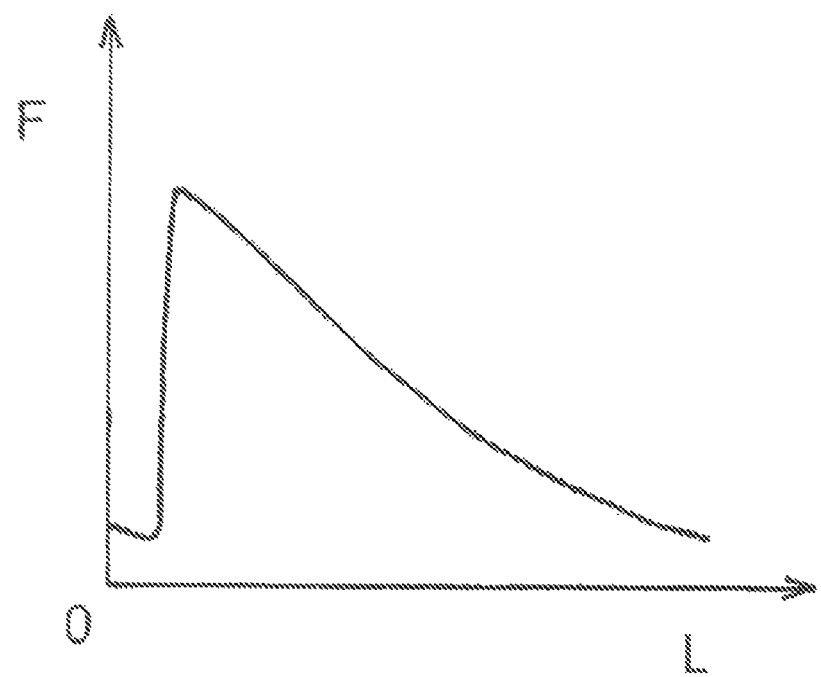
FIG. 3, already discussed above, schematically shows the resetting force exerted onto the axially adjustable ring as a function of the nozzle gap in a VGT having an axially adjustable ring provided with balance holes according to prior art.
Figure 11:
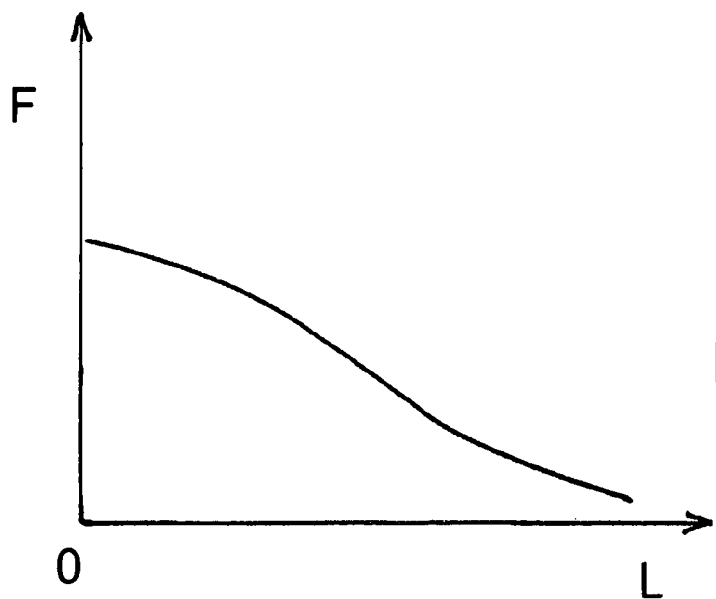
FIG. 11 schematically shows the resetting force exerted onto the axially adjustable ring as a function of the nozzle gap in a VGT according to the present invention.

The position of the balance holes on the ring and their dimension can be chosen, as already happens for the prior art, according to the desired pressure in the chamber behind the ring, bearing in mind that, along the nozzle, the static pressure is higher towards the inlet scroll and lower towards the turbine rotor. The holes can have a diameter (for example) of 50-90% of the concerned vane passage width, or equivalent dimensions in case of a non-circular section. The VGT according to the present invention brings considerable advantages. The sharp pressure drop provoked by the interference of the holes at very small nozzle gaps, is avoided. In FIG. 11, the trend of the resetting force as a function of the nozzle gap in a VGT according to the present invention is schematically shown. Since the force collapse does not occur (compare FIG. 3), narrowing of the nozzle gap can be allowed down to values much lower than according to the prior art, achieving, for example, in the case of turbochargers turbines for supercharged internal combustion engines, a higher engine braking power and a better performance in transient conditions, in combination with improved control stability.

A further advantage is the reduction in fluid pressure loss across the nozzle, resulting in higher efficiency of the turbine when recovering energy from fluid discharge.

What is claimed is:

1. Variable geometry turbine comprising a housing (22), a turbine rotor (4), a fluid inlet (1) that surrounds said turbine rotor, a vaned nozzle interposed between said fluid inlet and said turbine rotor conceived to accelerate the flow of fluid, said nozzle comprising an axially adjustable ring (25) conceived to vary the nozzle gap (23) and having a wall (19) axially delimiting said nozzle gap, said wall having vanes (27) and balance holes (26, 26'), the balance holes (26, 26') being interposed between said vanes (27) and connecting said nozzle gap with a chamber (12) delimited by said housing and said ring, wherein the edges (16), formed by said holes with the surface (18) of said wall facing said nozzle gap, are rounded off in the portion (17, 17') located downstream the hole with respect to the fluid flow.

2. Turbine according to claim 1, wherein the maximum round off curvature (17, 17') of said edge is exceeding a radius (R) representing 20% of the maximum width of the balance hole (S) in the average flow direction (20) in the area of the hole.

3. Turbine according to claim 1 wherein the round off curvature in flow direction (20) essentially has a parabolic or elliptic shape.

4. Turbine according to any one of the previous claims, wherein the border (15, 15') of the rounded area is lengthened in the direction of the fluid flow.

5. Turbine according to claim 1, wherein the rounding off has a geometry as achievable by three-axis milling with radius cutters.

6. Gas turbine according to claim 1.

7. Turbine according to claim 6 for turbochargers of supercharged internal combustion engines.

8. Turbocharger for a supercharged internal combustion engine including a turbine according to claim 7.

9. Supercharged internal combustion engine for vehicles including a turbocharger according to claim 8.

* * * * *